United States Patent
Sullivan et al.

[15] 3,672,130
[45] June 27, 1972

[54] RETENTION MEANS FOR AIR CLEANER ELEMENT

[72] Inventors: Bruce M. Sullivan, Burnsville; Carl M. Kaus, Bloomington, both of Mich.

[73] Assignee: Donaldson Company, Inc., Minneapolis, Minn.

[22] Filed: April 2, 1970

[21] Appl. No.: 25,092

[52] U.S. Cl.................................55/323, 55/330, 55/333, 55/337, 55/432, 55/449, 55/457, 55/481, 55/487, 55/498, 55/502, 55/504, 55/507, 55/509, 55/510, 55/DIG. 28
[51] Int. Cl..................................................B01d 59/50
[58] Field of Search.....................55/337, 428, 432–433, 55/456–457, 481–482, 504–505, 508–511, 495, 497–498, 500, 502, 505–507, 323, 325–326, 521, 330, DIG. 28, 486–488; 210/315, 304, 232, 444, 447–448

[56] References Cited

UNITED STATES PATENTS

| | | | |
|---|---|---|---|
| 1,107,485 | 8/1914 | Bowser | 55/337 UX |
| 940,142 | 11/1909 | Fogarty | 55/486 X |
| 2,921,777 | 1/1960 | Hepp | 55/509 UX |
| 3,201,927 | 8/1965 | Wachter | 55/504 |
| 751,918 | 2/1904 | Jagger | 210/448 |
| 2,647,636 | 8/1953 | Rafferty | 210/448 X |
| 3,429,108 | 2/1969 | Larson | 55/337 X |
| 2,979,159 | 4/1961 | Pritchard et al. | 55/482 |
| 3,494,114 | 2/1970 | Nelson et al. | 55/482 |
| 3,174,775 | 3/1965 | Clayton | 55/507 |

FOREIGN PATENTS OR APPLICATIONS

| | | | |
|---|---|---|---|
| 913,261 | 7/1949 | Germany | 55/505 |
| 906,638 | 3/1944 | France | 55/481 |
| 926,901 | 4/1955 | Germany | 55/503 |

*Primary Examiner*—Dennis E. Talbert, Jr.
*Assistant Examiner*—Vincent Gifford
*Attorney*—Merchant & Gould

[57] ABSTRACT

The disclosure is directed to a centrifugal air cleaner which includes within an outer container a primary filter assembly and a secondary backup filter assembly, both of which are removably disposed for purposes of maintenance and replacement. The primary filter assembly is sealably held between the ends of the container. The secondary assembly is disposed within the primary assembly, but is independently supported at the filtered fluid outlet by a plurality of beaded spring clips which cooperate with an annular recess located on the inner wall of the outlet.

5 Claims, 5 Drawing Figures

INVENTORS.
BRUCE M. SULLIVAN
CARL M. KAUS
BY
Merchant & Gould
ATTORNEYS

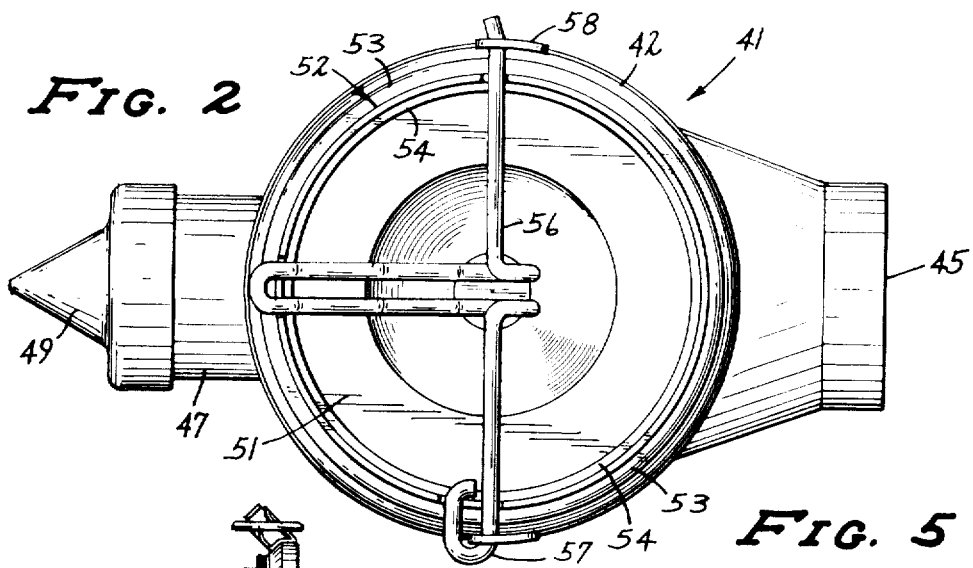
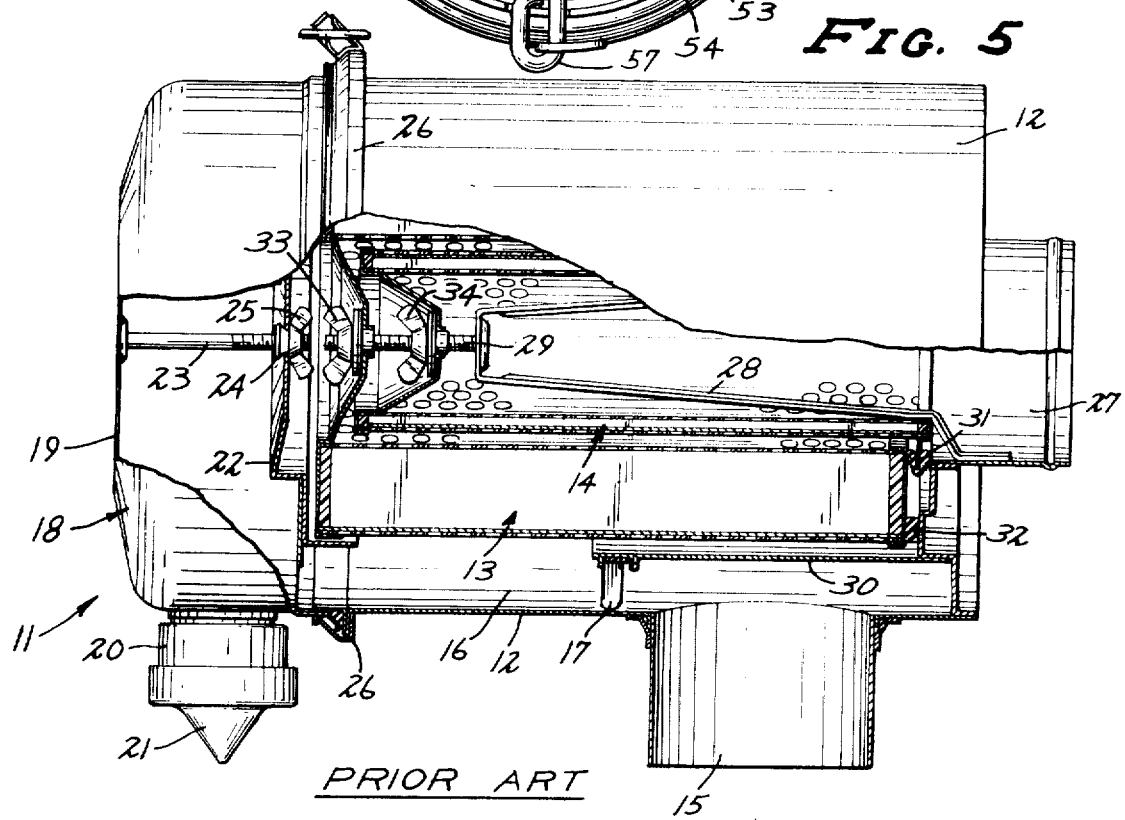
PRIOR ART

RETENTION MEANS FOR AIR CLEANER ELEMENT

The invention is directed generally to the field of air cleaners used with internal combustion engines, and specifically to centrifugal air cleaners that are particularly efficient in removing dust and dirt.

Under conditions where dust and dirt prevail in surrounding air, it is extremely important that air cleaners having adequate dust removal capability be used to enable continuous satisfactory performance of internal combustion engines. The centrifugal air cleaner has been found to perform this function very efficiently, although systematic inspection and maintenance of the air filter assembly are a necessity.

U.S. Pat. No. 3,078,650, issued to Dale K. Anderson and William R. Wolff on Feb. 26, 1963, discloses and claims such a centrifugal air cleaner. In this type of device, an annular air filter assembly is inserted into a cylindrical outer container and forms an annular air passage therewith. Unfiltered air is taken in through an inlet at one end of the annular passage, and is caused to swirl or flow spirally to the opposite end of the passage. The swirling air flow causes dust and dirt particles brought in with the unfiltered air to be centrifugally forced against the outer container, and they are collected and removed through a dust outlet disposed at the opposite end of the passage. An air impervious baffle encircles a portion of the air filter assembly at the opposite end of the annular passage to prevent the collected dust and dirt particles from passing into the adjacent air filtering material.

Air in the annular passage is drawn radially inwardly by the pressure differential created by the internal combustion engine, and flows through a passage formed in the center of the air filter assembly to the carburetion system.

Because continuous filtration of dust and dirt is necessary to prevent damage to the engine, it has become the practice to include a secondary filter assembly of somewhat less filtering capability to provide filtration in case of breakage or damage to the primary element. Under normal operation, the secondary element does little filtering and causes an insignificant pressure drop since the primary element carries the filtering load. With breakage or damage to the primary, however, the secondary element has sufficient filtering capacity to enable safe operation of the engine for a period of time.

Although the secondary filter assembly provides backup filtration, its incorporation into the air cleaner has presented problems. For instance, the prevalent method of supporting and retaining secondary filter elements in centrifugal air cleaners has been through the use of an A-frame yoke to which the element is fastened. Obviously, including the yoke in an air filter container is more difficult to manufacture and therefore more expensive to produce. Further, it adds cost to all containers whether or not the secondary filter element is used. Fastening and unfastening the filter element for purposes of maintenance and replacement has also been found to be both time consuming and highly inconvenient.

Our invention is the result of an endeavor to solve these problems. The inventive combination accomplishes this through the use of a secondary filter element that is disposed within the primary element, but is independently supported in cantilever fashion by inserting it into the outlet tube of the air cleaner housing. The secondary element is held in place through formation of an annular groove on the inner face of the outlet tube, and providing the supporting end of the secondary element with a plurality of beaded spring clips which are received by the annular groove. The secondary filter assembly also includes an annular collar at the supporting end which cooperates with an associated end of the air cleaner housing to provide a seal.

In addition to solving the problems stated above, the inventive combination permits the primary filter element to be removed without affecting the sealed condition of the secondary element. Further, the only change made to the air cleaner housing is provision of the annular groove on the inner face of the outlet tube. Thus, the additional cost of an air cleaner using a secondary filter element is in the secondary element itself. Because of the unique method of supporting and retaining the secondary element, maintenance and replacement are a simple matter.

BRIEF DESCRIPTION OF THE DRAWINGS

FIG. 2 is an end view of the centrifugal air cleaner;

FIG. 5 is a side view of a centrifugal air cleaner illustrating a prior art supporting structure for a safety filter element, part thereof being broken away.

DESCRIPTION OF THE PREFERRED EMBODIMENT

Figure 1:
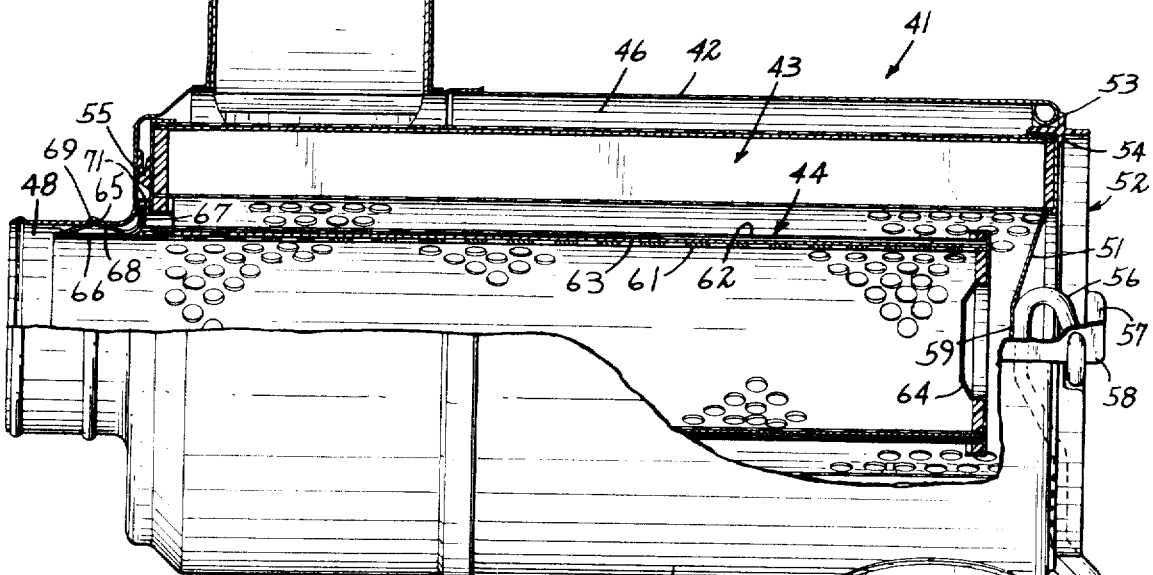
FIG. 1 is a side view of a centrifugal air cleaner embodying the inventive principle, part thereof being broken away.

FIG. 5 is referred to initially for the purpose of illustrating a centrifugal air cleaner employing conventional structure for supporting and retaining a secondary filter element. The centrifugal air cleaner is represented generally by numeral 11 and consists of a cylindrical outer container 12 which houses concentric primary and secondary filter elements 13 and 14, respectively. Outer container 12 has an air inlet 15 which receives and distributes unfiltered air to an annular space 16 which is defined by the inner face of container 12 and the outer face of primary element 13. A plurality of fins 17 (only one of which is shown) carried by an air impervious cylindrical baffle 30 are disposed adjacent inlet 15 to cause the incoming air to flow in a spiral fashion through space 16.

A dust collecting assembly 18 is constructed to sealably close the open left end of container 12. Assembly 18 consists of an outer shell 19, an outlet 20 projecting radially outward from shell 19 with a dust cup 21 mounted thereon, and a baffle plate 22 which is carried by a screw 23, collar 24 and wing nut 25.

Shell 19 has a radius chosen to telescopically fit over the open left end of container 12, and is receivably retained by a clamping band 26. The radius of baffle plate 22 is chosen to telescopically fit over the left end of primary element 13 when positioned properly.

The right end of container 12 terminates in a filtered air outlet 27. Affixed to the inner face of outlet 27 is a frame 28 which takes the general form of an A-frame. Projecting from the end frame 28 is a screw 29 which supports and retains the left end of both primary element 13 and secondary element 14. The right end of secondary filter element 14 is open to fit over frame 28 and sealably engage the right end of container 12 through a gasket member 31. Similarly, primary filter element 13 is open at its right end and sealably engages a sealing member 32 at the right end of container 12. Both elements 13, 14 are closed at their left ends and include apertures for receiving screw 29 upon proper placement over frame 28. Wing nuts 33, 34 secure filter elements 13, 14 respectively, to frame 28.

In operation, unfiltered air is taken in through inlet 15 and caused to swirl or spirally flow through annular space 16 by fins 17. Sleeve 30 assists in the generation of a swirling flow by preventing radially inward filtration of air through the right end of primary element 13. This spiral air flow imparts centrifugal force to any dust, dirt or other impure particles brought into inlet 15 driving them radially outward along annular space 16 until they are collected in the dust collecting assembly 18 and exhausted by dust cup 21. Baffle plate 22 prevents the dust and dirt particles from entering primary filter element 13 after having been collected in assembly 18.

While the dirt and dust particles are driven outward by centrifugal force, the air flowing spirally in annular space 16 is drawn inwardly through primary filter element 13 by a pulsating pressure differential created by operation of the internal combustion engine. The air is filtered as it passes through element 13, and continues through secondary filter element 14, outlet 27 and on to the carburetion system intake of the engine.

In order to remove either of the filter elements 13, 14 for routine inspection, maintenance or replacement, it is first necessary to remove clamping band 26 and dust collecting assembly 18. Wing nut 33 can then be removed from screw 29 for removal of primary element 13, and wing nut 34 is then unscrewed to permit removal of secondary element 14. Reinsertion of elements 13, 14 is in the reverse manner, making sure that the open right ends of each properly engages gasket elements 31, 32 respectively.

FIGS. 1 and 2 disclose an improved centrifugal air cleaner 41. Air cleaner 41 also includes an outer container 42 which houses a primary filter element 43 and a secondary filter element 44. An air inlet 45 communicates with an annular passage 46 defined by the inner face of container 42 and the outer face of primary filter element 43. Air cleaner 41 has a first outlet 47 communicating directly with annular passage 46 and a second outlet 48 for the filtered air. A dust cup 49 is used with outlet 47 as hereinabove described.

As best seen in FIG. 1, the open right end of container 42 is rolled to provide a smooth peripheral edge.

Primary filter element 43 is cylindrical in shape, one end being closed by a plate 51 with the opposite end open. Primary element 43 is removably supported within container 42 in a conventional fashion by first fitting the closed end with a resilient sleeve 52 having an outwardly projecting flange 53 and an inwardly projecting flange 54 for properly positioning sleeve 52 on element 43. Element 43 is inserted into the open end of container 42 so that the left end sealably engages container 42 by means of a gasket 55, with sleeve 52 and the flange 53 sealably engaging the rolled edge. Element 43 is held in position by a clamping member 56 (see also FIG. 2), which has a pair of extending biasing arms which receive support from a pair of ears 57, 58 mounted on container 42. Between the extended biasing arms of clamping member 56 is a camming surface 59 which can be rotated into a spring-biased engagement within cap 51 of element 43. The extended biasing arm associated with ear 57 is looped so that in the disengaged position clamping member 56 can be swung out and away to enable removal of primary element 43 from container 42.

Figure 3:
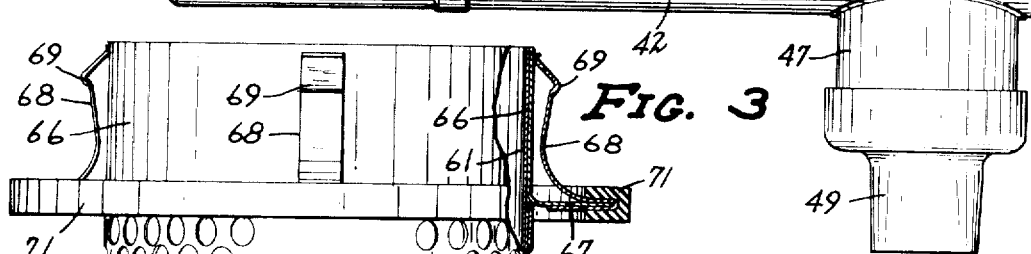
FIG. 3 is a side view of a safety filter element adapted for use in the centrifugal air cleaner, portions thereof being broken away.

Referring additionally to FIG. 3, secondary filter element 44 is similar to element 43, consisting of inner and outer perforated shells 61 and 62, respectively, with filtering material 63 disposed therebetween. One end of element 44 is open, while the other is closed with an end cap 64. Element 44 differs from element 43 by being smaller in size and having filtering material of somewhat less filtering capacity in order that the already filtered air does not undergo another significant pressure drop.

As best seen in FIG. 1, the inside diameter of outlet 48 is slightly greater than the outer diameter of perforated shell 61 to enable it to receive and support secondary element 44. The inner face of outlet 48 is formed with an annular recess or groove 65 that assists in this supporting function, as described below.

Figure 4:
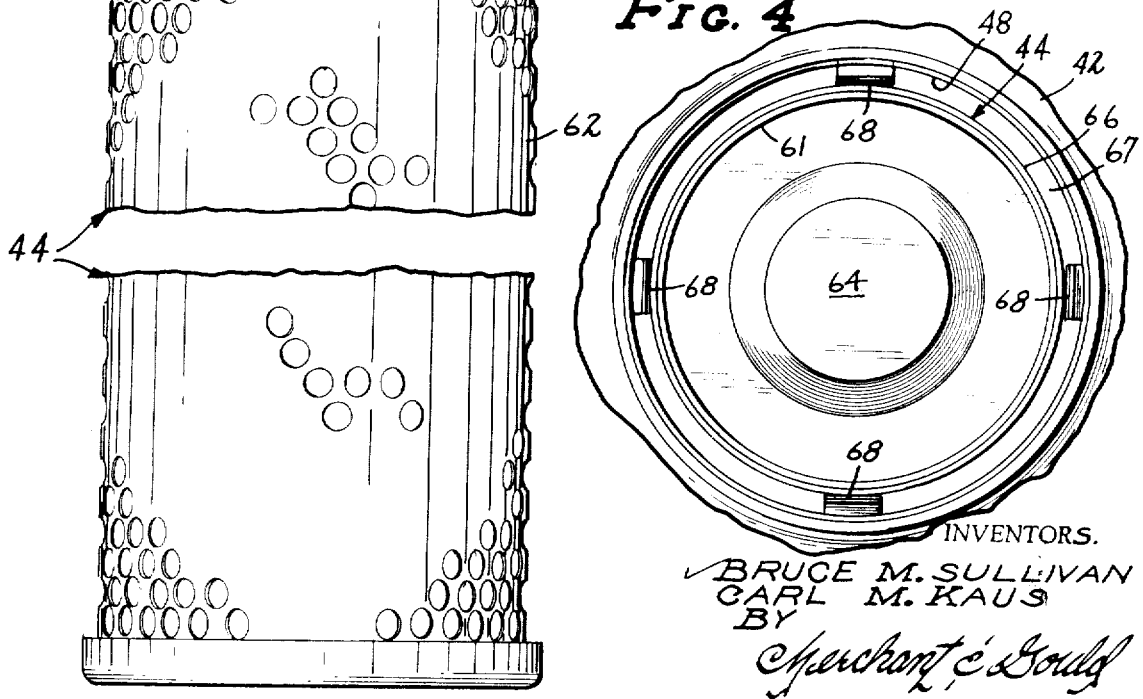
FIG. 4 is an enlarged fragmentary end view of the centrifugal air cleaner with the safety filter element properly inserted.

As seen in FIG. 3, a cylindrical sleeve 66 having an outturned flange 67 is affixed to outer perforated shell 61 adjacent the open end of filter element 44. Sleeve 66 carries a plurality of spring clips 68, each of which projects toward the open end of filter element 44 and includes a raised or beaded portion 69 which is sized to fit into the annular groove 65 in outlet 48. The clips 68 frictionally fit over flange 67 and are held in place by a resilient gasket member 71 having an annular groove which also enables it to snugly fit over flange 67. Thus, with primary filter element 43 removed, secondary filter element 44 can be placed in air cleaner 41 by inserting its open end into outlet 48 until the raised portion 69 of each clip 68 is received by annular groove 65. See FIG. 4. This not only supports and locks filter element 44 in place, but also causes gasket member 71 to engage the end of container 42 to form a seal therewith. Hence, should the primary element 43 of a fully assembled air cleaner 41 become defective, the secondary element 44 provides a sufficient filtering function until primary element 43 can be replaced.

The inventive combination enables both the primary and secondary filter elements to be inspected, serviced or replaced more quickly and efficiently than in the prior art device. Moreover, the only modification to a prior art container having a primary filter element as shown in FIGS. 1 and 2 is formation of the annular groove 65 in outlet 48. The only change in secondary filter element 44 over that shown in FIG. 1 is the addition of sleeve 66 and clips 68. Consequently, the resulting combination offers firm support to secondary element 44 while substantially reducing manufacturing costs and improving the ease of assembly and disassembly in the field.

What is claimed is:

1. A centrifugal fluid cleaner comprising:
   a. an outer container having first and second ends;
   b. a primary fluid filter assembly having first and second ends with a first fluid passage formed therethrough, the primary filter assembly removably supported in the outer container and forming a second fluid passage therewith;
   c. fluid inlet means communicating with one end of the second passage for receiving unfiltered fluid;
   d. a first outlet communicating with the opposite end of the second passage for receiving and exhausting impure particles;
   e. a second outlet for receiving and conducting filtered fluid from the fluid cleaner, comprising
      1. an opening formed in the first end of the outer container;
      2. and a fluid conducting outlet member of predetermined size and shape communicating with the opening and projecting outwardly therefrom, the fluid conducting member having an inner face in which a groove is formed;
   f. fluid control means for effecting a spiral fluid flow in the second passage between the inlet means and the first outlet, thereby imparting centrifugal force to impure particles in the second fluid passage;
   g. and a secondary fluid filter assembly having first and second ends with a third fluid passage formed therethrough, the second end being closed;
   h. the first end of the secondary filter assembly being sealably insertable into said outlet member, and removably supported independent of the first filter assembly by supporting means comprising
      1. a plurality of spring clips affixed to the first end of the secondary filter assembly, each clip having a ridge portion receivable in said groove in spring-biased relation therewith upon insertion of said first end of the secondary filter assembly into said outlet member.

2. The apparatus as defined by claim 1, wherein the outlet member and the first end of the second fluid filter assembly are cylindrical in shape.

3. The apparatus as defined by claim 1 and further comprising:
   a. a sleeve member constructed to fit over the first end of the secondary filter assembly and having an outturned flange spaced therefrom;
   b. each of the spring clips being carried by the flange and projecting toward the first end;
   c. and a resilient sealing member encircling the flange and carried thereby, the sealing member constructed and arranged to sealably engage the first end of the outer container upon insertion of the secondary fluid filter assembly into the outlet member.

4. A replaceable filter assembly for a centrifugal fluid cleaner having a fluid inlet, a first fluid outlet for centrifuged impure particles, and a second outlet for the filtered fluid defined by a projecting outlet member of predetermined size and shape and having an inner face with a groove formed therein, the filter assembly comprising:

a. an elongated filter cartridge having a first end sized for insertion into the outlet member, a second end and a longitudinal passage formed therein between the first and second ends;
b. a sleeve member constructed to fit over the filter cartridge and having an outturned flange spaced from the first end;
c. a plurality of spring clips carried by the flange and projecting toward the first end of the cartridge, each clip having a ridge portion adapted to be received in the groove in spring-biased relation therewith upon insertion of the filter assembly into the outlet member;
d. and a sealing member mounted on the flange to sealably engage the centrifugal air cleaner adjacent the second outlet and thereby prevent the passage of unfiltered air therefrom.

5. The apparatus as defined by claim 4, wherein the filter cartridge is cylindrical.

* * * * *